Jan. 12, 1954
J. F. ALCOCK
2,665,786
MEANS FOR EFFECTING GEAR-CHANGE OPERATIONS IN
VARIABLE SPEED POWER TRANSMISSION MECHANISMS
Filed Jan. 22, 1951
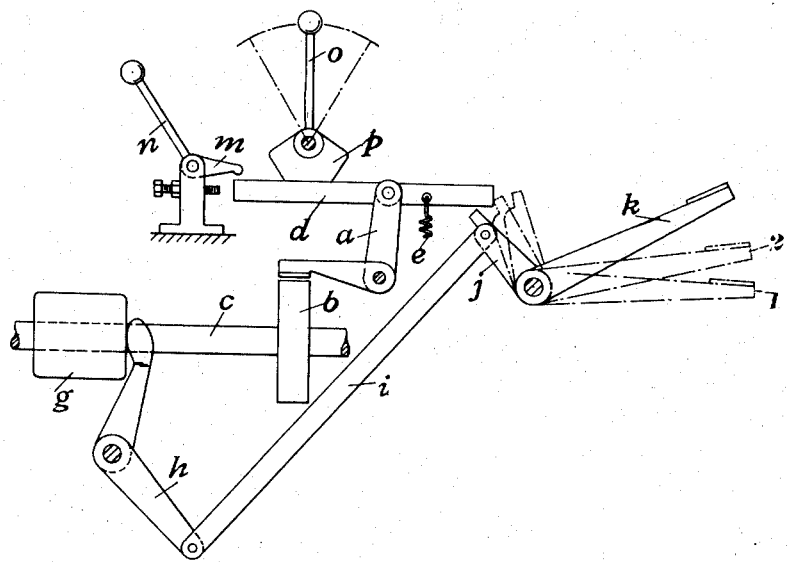
Inventor
J. F. Alcock
By
Attys.

UNITED STATES PATENT OFFICE 2,665,786

MEANS FOR EFFECTING GEAR-CHANGE OPERATIONS IN VARIABLE SPEED POWER TRANSMISSION MECHANISMS

John Frederick Alcock, Leeds, England

Application January 22, 1951, Serial No. 207,144

Claims priority, application Great Britain February 17, 1950

4 Claims. (Cl. 192—.09)

This invention has for its object to provide improved means for effecting gear-change operations in variable-speed power transmission mechanisms of the kind where motion is imparted to the mechanism from an internal combustion engine through a clutch, hydraulic coupling, torque converter, or other power-control means and the fuel supplied to the engine is under the control of a throttle lever.

The invention comprises means whereby, when the power control means is disengaged, the force required to maintain it disengaged, while changing gears in the upward direction, is utilised to operate a braking means, and whereby braking means is rendered inoperative while changing gears in the downward direction.

In particular the invention comprises the combination of a lever adapted to actuate a braking means associated with the input shaft of the mechanism, a trip bar pivotally mounted on the said lever, and means respectively operable by the control pedal, the gear change lever, and the throttle lever for actuating the trip bar in the manner hereinafter described.

The accompanying diagram illustrates one embodiment of the invention.

Referring to the diagram, there is provided a bell crank lever $a$ which at one end is adapted to exert a frictional braking action on a brake disc $b$ carried by the power input shaft $c$ of the mechanism. On the other end of this lever is pivotally mounted a trip bar $d$ which is loaded by a spring $e$ or a weight and extends laterally beyond both sides of the lever $a$. Also it has a limited range of endwise movement.

For actuating a movable member $g$ on the shaft $c$ for actuating the clutch or other power-control means (not shown), there is provided any convenient lever $h$, link $i$ and lever $j$ connected to a control pedal $k$, and one end of the lever $j$ is adapted to serve as a pawl which can engage one end of the trip bar $d$.

At the other end of the trip bar is arranged a lever $m$ associated with the throttle lever $n$, for tilting the trip bar $d$, and at a position adjacent this end is arranged a lever $o$ associated with the gear-change lever for tilting the trip bar $d$ through a 3-faced cam $p$.

The arrangement is such that when the driver desires to effect a gear-change in the upward direction, he depresses the pedal $k$ (to position 1) for releasing the clutch, and in so doing the lever $j$ tilts the trip bar $d$ against the action of its spring or weight and then engages the adjacent end of the bar. At the same time the driver moves the gear change lever to its neutral position as shown. On releasing the foot pressure on the pedal $k$ the latter returns through a small angle (to position 2) under the action of the spring associated with the clutch or other power control means. In so doing the lever $j$ exerts endwise pressure on the trip bar and so causes the latter to move the brake lever $a$ into action. On again depressing the pedal $k$ to its previous position (1), the driver moves the gear change lever $a$ to its new position, and in so doing the associated cam $p$ tilts the trip bar $d$, so that when the pedal $k$ is again released, it can return to its normal position. Also in this action the brake on the input shaft is released.

When the driver desires to make a gear change in the downward direction, this can be effected in the usual manner (for example by double declutching) as the accompanying actuation of the throttle lever $n$ causes the associated lever $m$ to tilt the trip bar $d$ clear of the lever $j$ associated with the pedal $k$, so rendering the braking means inoperative and enabling the pedal to be actuated without obstruction by the trip bar.

By this invention gear changing operations in power transmission mechanisms of the kind specified can be greatly simplified, and the skill and judgment ordinarily required on the part of the driver is reduced to a minimum. The invention is more especially intended for use on diesel locomotives but it may be applied to other analogous uses, as for example on heavy transport vehicles or military machines such as tanks.

Having thus described my invention what I claim as new and desire to secure by Letters Patent is:

1. Means for effecting gear-change operations in a variable speed power transmission mechanism of the kind specified, comprising the combination of a lever adapted to actuate a braking means associated with the input shaft of the mechanism, a trip bar pivotally mounted on the said lever, a pedal, a lever operable by the said pedal for cooperating with the trip bar, power-control means operable by the pedal, and a cam operable by a gear-change lever and a lever operable by a throttle lever, for moving the trip bar away from the said lever operable by the pedal.

2. Means as claimed in claim 1, in which the trip bar is loaded by a spring in the direction for effecting engagement with the lever operable by the pedal.

3. Means for effecting gear-change operations in a variable speed power transmission mechanism of the kind specified, comprising the combination with a rotatable part of said mechanism, and power control means movable in opposite directions, of braking means for said rotatable part, mechanism for moving said control means in one direction, and bringing said braking means into action, and means for co-operating with said mechanism for rendering said braking means inoperative.

4. Means for effecting gear-change operations in a variable speed power transmission mechanism, comprising the combination with a rotatable input shaft of said mechanism, a gear change lever for varying the speed ratio of said mechanism, and power control means movable in opposite directions, of braking means for said input shaft, an actuating lever for said braking means, a trip bar pivotally mounted on said actuating lever, a control pedal, means operable by said control pedal for moving said power control means in one direction, and moving said trip bar in the direction for causing said actuating lever to bring said braking means into action, a throttle lever, means operable by said throttle lever for moving said trip bar into a position clear of the means operable by said control pedal, and additional means operable by said gear change lever for moving said trip bar into a position clear of the means operable by said control pedal.

JOHN FREDERICK ALCOCK.

References Cited in the file of this patent

UNITED STATES PATENTS

| Number | Name | Date |
|---|---|---|
| 1,541,240 | Barkeij | June 9, 1925 |
| 1,883,743 | Maybach | Oct. 18, 1932 |
| 1,978,172 | Sinclair | Oct. 23, 1934 |
| 2,102,755 | Sinclair | Dec. 21, 1937 |
| 2,104,608 | Cox | Jan. 4, 1938 |